United States Patent [19]

Koepke et al.

[11] 4,341,642
[45] Jul. 27, 1982

[54] PROCESS AND AN APPARATUS FOR CONTINUOUSLY FILTERING LIQUIDS

[75] Inventors: Günther Koepke, Odenthal; Hans Frenken, Odenthal-Osenau; Josef Friedsam, Langenfeld, all of Fed. Rep. of Germany

[73] Assignee: Agfa-Gevaert Aktiengesellschaft, Leverkusen, Fed. Rep. of Germany

[21] Appl. No.: 295,809

[22] Filed: Aug. 24, 1981

[30] Foreign Application Priority Data

Aug. 29, 1980 [DE] Fed. Rep. of Germany ....... 3032690

[51] Int. Cl.³ ............................................. B01D 37/00
[52] U.S. Cl. ................................... 210/767; 210/790; 210/142; 210/341; 210/436; 210/472
[58] Field of Search ............... 210/767, 790, 791, 137, 210/141, 142, 232, 238, 341, 436, 472

[56] References Cited

U.S. PATENT DOCUMENTS

| | | | |
|---|---|---|---|
| 3,056,499 | 10/1962 | Liddell | 210/436 |
| 3,618,781 | 11/1971 | Brown | 210/341 |
| 3,815,746 | 6/1974 | Ward | 210/436 |
| 3,833,121 | 9/1974 | Singleton | 210/472 |
| 3,915,866 | 10/1975 | Brown | 210/341 |
| 3,979,232 | 9/1976 | Kuhn | 210/436 |
| 4,039,305 | 8/1977 | Livesay | 210/472 |
| 4,248,713 | 2/1981 | Meier | 210/341 |

*Primary Examiner*—Ernest G. Therkorn
*Attorney, Agent, or Firm*—Connolly and Hutz

[57] ABSTRACT

The invention relates to a process and an apparatus for continuously filtering liquids whereby two candle filters are arranged closely adjacent to one another and are connected by a first three-way cock at the liquid inlet ends, a second three-way cock at the liquid outlet ends of the candle filters and a bypass cock for a partial stream and enabling the candle filters to be emptied in such a manner that the candle filters are filled and vented before they are put into operation and one of the two candle filters always is ready for operation with degassed and filtered liquid if one of the candle filters is to be cleaned.

6 Claims, 4 Drawing Figures

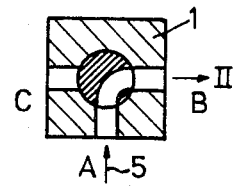
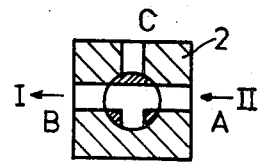
FIG. 2
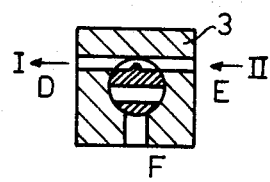
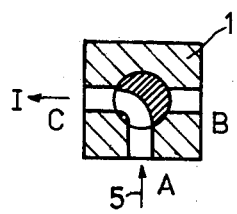
FIG. 3
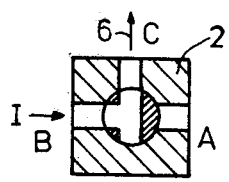
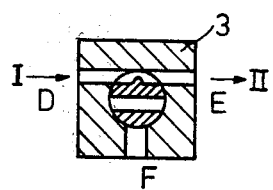

PROCESS AND AN APPARATUS FOR CONTINUOUSLY FILTERING LIQUIDS

This invention relates to a process and an apparatus for continuously filtering liquids, comprising two candle filters and change-over means for selectively using either one or the other candle filter and a bypass for venting and filling the particular candle filter before it is put into operation.

Candle filters (deep filters) are used for continuously filtering liquids, for example photographic emulsions. Where the production times are longer than the service lives of the filters, production has to be interrupted for the purpose of changing the filter candles. This results in considerable losses of material and, through stoppages of the expensive production machines, in a reduction in output per machine.

Automatically or manually reversible dual filter installations are known which involve considerable outlay on apparatus and correspondingly high investment costs. In addition, all known systems are attended by the disadvantage that the interiors of the filter candles cannot be vented during filling. As a result, the trapped air is entrained by the product stream in the form of small bubbles without control over long periods of production. Since, in the photographic industry for example, the photographic emulsion applied in the coating of supports has to be kept strictly free from bubbles, a fairly long period of time which cannot be precisely defined is required for venting the filter at the beginning of the coating process or in the event of a filter change. This reduces the utilisation of capacity, particularly when the product is frequently changed. In addition, residual bubbles cannot always be prevented from being released after coating has begun, making the coated product useless.

A prospectus issued by the Fuji Filter MFG. Co. Ltd., Japan (Fujiplate Polymer Filter) describes a filter system comprising two filter units A and B arranged in parallel. While filter A is in operation, filter B can be emptied and cleaned. To this end, an outlet valve is provided with a bypass through which the cleaning agent is introduced into the filter against the throughflow direction. The inlet valve is provided with a bypass through which the cleaning agent flows out. The disadvantage of this filter system is that the filters and filter housing cannot be adequately vented.

An object of the present invention is to provide a process and an apparatus of the type mentioned at the beginning by which it is readily possible continuously to filter liquids without any inclusions or small bubbles of air entering the filtered liquid, a second filter being immediately ready for use for a filtered liquid of the same batch when the apparatus is switched over to this second filter.

Starting with a process and an apparatus of the type mentioned at the beginning, this object is achieved in that, in a process for vention and filling candle filters when they are brought into operation, three cocks are switched in such a way that, from the inlet via the path $\overline{AB}$ of the first cock, the liquid fills the candle filter II from outside and vents the filter chamber through a spout, the air and a steady small partial stream of the liquid being delivered to a subsequent degassing system, the liquid already filtered in the candle filter II and degassed is introduced via the path $\overline{AB}$ of the second cock into the interior of the filter candles of the candle filter I, vents the filter and the outer space from inside and is delivered through a spout into the subsequent degassing system, at the same time a small partial stream of the filtered liquid is passed through a bypass cock and a constriction for the purpose of venting the bypass (ED), for operating the filters, the liquid is then reversed in its direction of flow through the candle filter I and is delivered filtered via the path $\overline{BC}$ of the second cock to a consumer, and a partial stream of the liquid filtered in the filter I flows via the bypass in the bypass cock with the constriction through the filter candle of the candle filter II from inside and frees the candle filter I from any remaining air bubbles and then flows continuously through the spout into the subsequent degassing system, for a filter change from the candle filter I to the candle filter II, the liquid first flows out through the paths $\overline{BC}$ and $\overline{AC}$ of the second cock to the consumer, the unfiltered liquid flows into the candle filter II through the paths $\overline{AB}$ of the first cock, and finally the liquid flows out through the path AC of the second cock to the consumer so that the candle filter I which has been switched off may be emptied via the path $\overline{DF}$ of the bypass cock and, for filling and venting the cleaned candle filter I, the liquid flows via the bypass $\overline{ED}$ of the bypass cock through the candle filter I from inside.

The predetermined switching sequence of the cocks in the process according to the invention ensures complete venting of the filters proper and of all the inner spaces of the candle filters and connections. The use of a two-way cock, three-way cock and bypass cock advantageously enables the filters and the filter housing to be rinsed and vented from inside with already filtered liquid. While one filter is in operation, therefore, the other filter—in readiness for operation—is always flushed by a partial stream of filtered liquid delivered through the bypass, the partial stream then being returned to production again through a spout via a degassing system. Accordingly, the filters may be changed over at any time, even during production, without any interruptions and thus immediately produce a filtered liquid of the same batch. The change-over and switch-on of the filters may be done by hand or even fully automatically by electronically controlled servo motors.

The apparatus for carrying out the process is distinguished with advantage by the fact that the candle filters I and II are arranged closely adjacent one another and, for the introduction of liquid, are connected to one another by a first two-way cock at the liquid inlet ends and, for the outlet of liquid to the consumer, are connected to one another by a three-way cock at the filter outlet ends, by the fact that a bypass cock is provided, connecting the filter outlet ends for a partial stream of the liquid to one another and enabling the candle filters to be emptied, and by the fact that the candle filters I and II are each provided with a spout through which a steady small partial stream of the liquid can be delivered to a degassing stage.

This dual filter unit is distinguished with advantage by its very compact, space-saving construction. The inlets and outlets, the switching cocks and the filter housing are integrated in such a way that no dead spaces are formed for possible inclusions or accumulations of air. Through the arrangement and design of the switching cocks, the switching operations are reduced to a minimum and readily enables the filters to be rinsed from inside with filtered liquid. Through an additional bypass cock and spout at the uppermost point of the filter housing, the filter on standby may be continuously vented and rinsed with a partial stream of the liquid so that, when it is used, it immediately produces filtered liquid from the same batch. The bypass is provided with a diaphragm which is sharp-edged and hence largely unaffected by viscosity.

The bypass operation of the filter standing in readiness provides for immediate change-over from filter I to filter II (or vice versa) without any stoppages in production. The filter which has been switched off may be emptied, dismantled, cleaned and vented during production. Standard commercial filter candles may also be used.

A filter change may be carried out in dependence upon the difference in pressure at the filter, which indicates the degree of soiling, or—in accordance with a predetermined plan—manually or under the control of a computer program. For fully automatic control, the switching cocks are provided with drives, such as operating magnets or servomotors.

One embodiment of the invention and the process are described in detail in the following with reference to the accompanying drawings, wherein:

FIG. 2 shows the position of the cocks when the filters are brought into operation.

FIG. 3 shows the position of the cocks when candle filter I is in operation.

Figure 1:
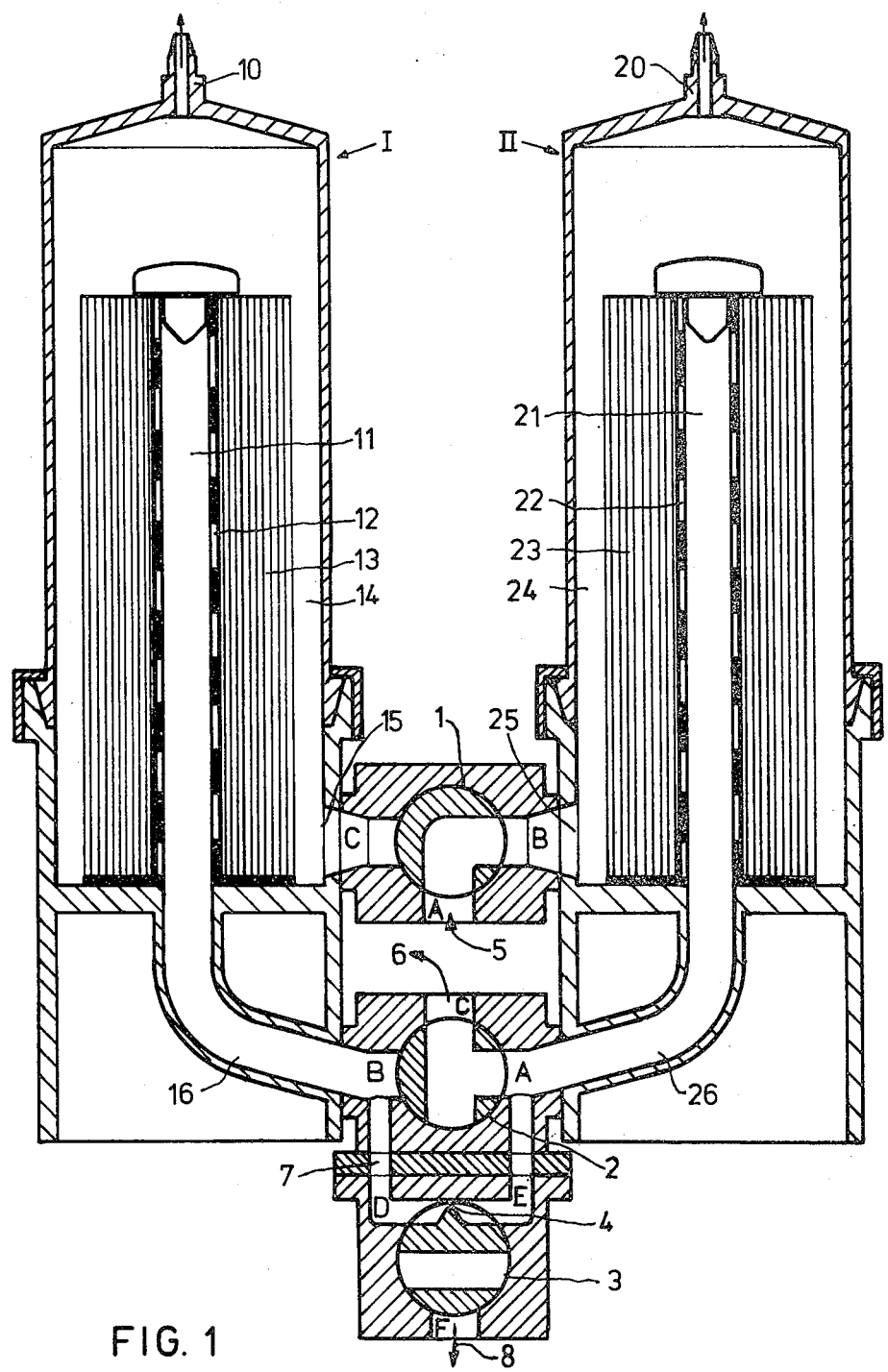
FIG. 1 shows an apparatus for continuously filtering liquids

FIG. 1 shows a filter unit consisting of two candle filters I and II in which the filter II is in operation while the filter I is on standby. The product, a liquid 5, is delivered by pump through an ascending pipe to a first cock 1, a two-way cock. The liquid flows through the cock 1 from the outside into the filter chamber 24, at the filter inlet end 25, passes through the filter body 23 and the filter tube 22 and thus enters the inner space 21 at the filter outlet end 26 and into the end A of a second cock 2, a three-way cock. In the illustrated position of the cock 2, the filtered liquid leaves the cock 2 at C and flows up an ascending pipe to a consumer 6.

Small air or gas bubbles present in the liquid to be filtered do not enter the filter body 23 providing it has a suitable pore size, but instead collect on its surface, combine and rise into the upper part of the filter. The filters are provided at their uppermost point with spouts 10, 20 through which a small partial stream of the liquid continuously flows away, entraining small gas or air bubbles. The spouts 10, 20 are connected by a pipe to a degassing system (not shown) in which the liquid is degassed and returned to production.

Beneath the second cock there is another cock 3, a bypass cock. In the illustrated position of the cock 3, a partial stream of the filtered liquid flows through the bypass $\overline{ED}$ at the filter outlet end 16 to the filter I, passes through the filter body 13 from the inner space 11 and the inner tube 12, flows into the outer space 14 of the filter I and leaves the filter through the spout 10. The effect of this measure is that the filter is always filled with the batch of liquid to be filtered which has just been produced and can thus be immediately switched over to the filter I when the filter II has to be cleaned. Any small bubbles of air are removed from the filter by the partial stream.

The cocks 1 to 3 may be individually changed over according to a plan for switch-on, operation and filter change. However, the cocks 1 to 3 may be provided with adjusting means, such as operating magnets or servomotors controlled by a computer (not shown), for automatic operation in dependence upon the pressure difference at the filter.

The bypass cock 3 has a constriction or diaphragm 4 which influences the partial stream through the bypass. The diaphragm 4 is provided with a sharp edge so that a partial stream of the same magnitude is obtained even for liquids with viscosities differing over wide ranges. At the same time, the bypass cock is used for emptying the filters I and II in its positions $\overline{DF}$ and $\overline{EF}$, respectively, the liquid flowing away through the outlet 8. The filter may thus be emptied, taken apart, cleaned, vented and made ready again while production goes on.

Figure 4:
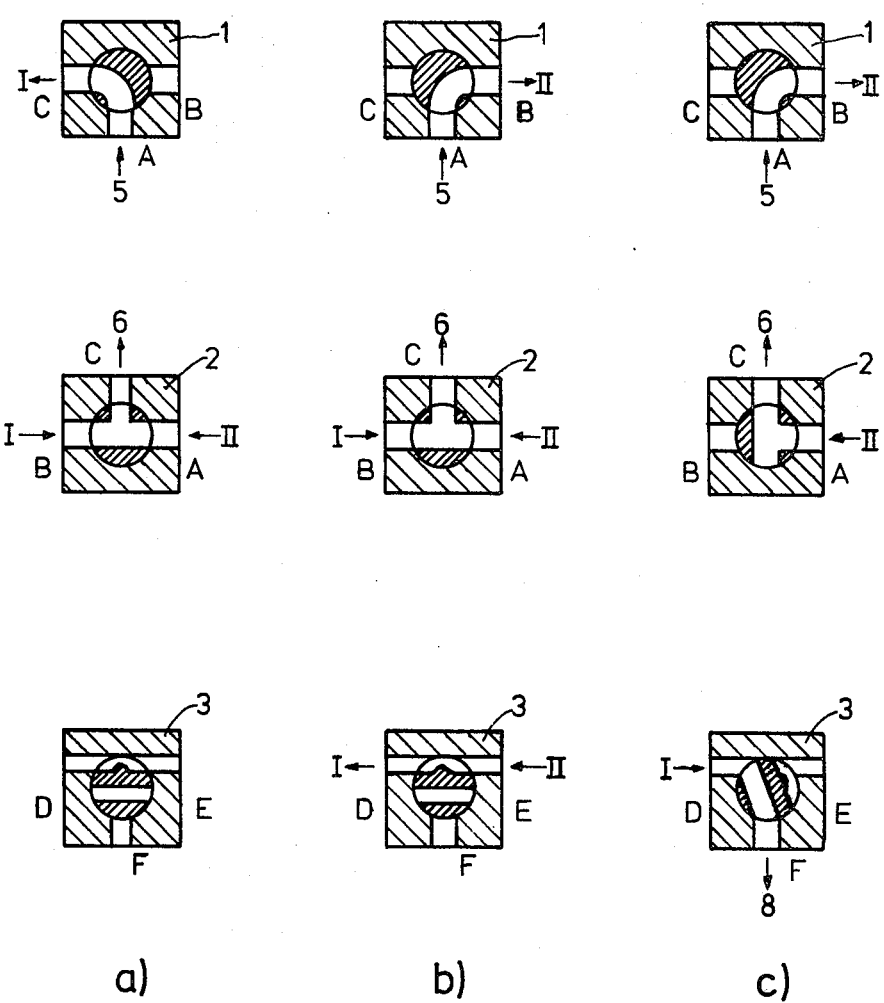
FIG. 4 shows the position sequence a, b, c of the cocks during change-over from candle filter I to candle filter II and emptying of candle filter I.

The individual process steps for putting the filter into operation, for working the filter I or II and for changing over from one filter to the other are shown in FIGS. 2, 3 and 4.

FIG. 2 shows the position of the cocks 1 to 3 at switch-on of the filter unit. The liquid to be filtered flows from 5 to the inlet of the cock 1 at A and leaves the cock 1 at B, flows through the filter II from outside and vents it through the spout 20 and passes filtered to the cock 2 at A, leaves the cock 2 at B and flows through the filter I from inside, vents the inner space 11, the filter tube 12, the filter body 13 and the outer space 14 of the filter and flows through the spout 10—displacing the air-present—to a following degassing system.

At the same time, a small partial stream of the liquid filtered in the filter II flows through the bypass 7 to the filter I in the direction from E to D for the purpose of degassing the bypass. In the position of the cocks 1 to 3 in FIG. 2, the filters I and II are degassed and made ready for production.

FIG. 3 shows a production position of the cocks 1 to 3 of the filters I and II in which the filter I is working and the filter II is on standby. The liquid 5 to be filtered flows through the cock 1 from A to C and through the filter I from outside to inside, i.e. in the opposite direction, and passes through the three-way cock 2 from B to C to a consumer 6. A small partial stream of the liquid filtered by the filter I flows through the bypass cock 3 on the path $\overline{DE}$ and then through the filter II from the inside outwards and leaves the standby filter II through the spout 20. While the filter I is working, the filter II is thus continuously supplied with already filtered liquid and kept ready for change-over.

FIG. 4 shows the change-over steps involved in a filter change from filter I to filter II. In FIG. 4a, the cock 2 is first switched in such a way that both filters I and II are able to supply filtered liquid the consumer 6. The cocks 1 and 3 remain unchanged during this switching step.

In FIG. 4b, the cock 1 is changed over in such a way that the liquid to be filtered flows in at A and flows to the filter II at B. The cocks 2 and 3 remain unchanged during the second step.

Finally, FIG. 4c shows the position of the cocks after the third step. While the liquid to be filtered flows through the cock 1 via $\overline{AB}$ to the filter II, the cock 2 is changed over in such a way that the liquid filtered by the filter II passes to the consumer 6 in the direction from A to C.

The bypass cock 3 is then switched in such a way that the liquid present in the filter is able to flow out into the pipe 8 via the path $\overline{DF}$. While the filter II is working, the filter I can be cleaned. The filter change is over. Change-over to the filter I takes place in the same way.

We claim:

1. A process for continuously filtering liquids in at least two candle filter means comprising the steps of introducing a liquid through a first control means into a first candle filter means, filtering said introduced liquid in said first candle filter means from an outer chamber of said first filter means to an inner chamber of said first filter means, filtered liquid being passable from the inner chamber of the first filter means through a second control means into an inner chamber of a second candle filter means, a lesser flow of filtered liquid from the inner chamber of the first filter means being passable through a by-pass control means into the inner chamber of said second filter means, said by-pass control means being adjustable so that the filtered liquid from the inner chamber of the first filter means is drainable through said by-pass control means, said flow of fluid being reversible by introducing a liquid through said first control means into an outer chamber of said second candle filter means, filtering said introduced liquid in said second filter means from the outer chamber to an inner chamber, said filtered liquid being removable from the inner chamber of said second candle filter means by passing through said second control means to the outlet from the combination, said by-pass control means being adjustable so that the filtered liquid from the inner chamber of the second filter means is drainable through said by-pass control means, including the steps of changing the filtering action from the first candle filter means to the second candle filter means comprising first passing filtered liquid from the first candle filter means through the second control means to the outlet, second passing unfiltered liquid into the outer chamber of the second candle filter means through the first control means, third passing filtered liquid out of the inner chamber of the second candle filter means through the second control means to the outlet, draining liquid out of the first candle filter means through the by-pass control means to outside the combination, and including the steps of passing liquid through a candle filter means and then flowing the liquid away and venting the liquid from said filter means.

2. A process as claimed in claim 1 wherein said first and second and by-pass control means are manually actuatable to change the passage of fluid.

3. A process as claimed in claim 1, wherein said first and second and by-pass control means are actuatable by servomotors to change the passage of fluid.

4. In apparatus for filtering fluids the combination of at least two candle filter means for receiving unfiltered fluid introduced from a first control means, each filter means including an outer chamber, a filter and an inner chamber, said unfiltered fluid being introduced into the respective outer chambers, a second control means to receive the filter fluid from the inner chambers of the respective filter means and connecting the two candle filter means, said second control means being adjustable to at least three paths for the passage of liquid, one path being for the connection of two candle filters to each other and the other paths being for the passage liquid from the inner chamber of the respective two candle filter means to an outlet from the combination, a by-pass control means connectible to the inner chambers of two candle filter means for the passage of partial stream of the liquid between said inner chambers, said by-pass control means being positionable whereby one or the other of the chambers of the filter means are drainable and vent means in each filter means for gradually releasing liquid from said filter means.

5. An apparatus as claimed in claim 4 wherein said outlets and vent means are capable of releasing all liquid from within the apparatus.

6. An apparatus as claimed in claim 4, characterised in that the bypass control means is provided with a diaphragm which is sharp-edged.

* * * * *